(12) United States Patent
Gee et al.

(10) Patent No.: US 6,312,313 B1
(45) Date of Patent: Nov. 6, 2001

(54) NON-LINEAR TRANSDUCER LAY-OUT OF THIN FILM HEAD WAFER FOR FABRICATION OF HIGH CAMBER AND CROWN SLIDERS

(75) Inventors: Glenn P. Gee; Tony J. Zhang, both of San Jose, CA (US)

(73) Assignee: Intenational Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,283

(22) Filed: Oct. 6, 1999

(51) Int. Cl.[7] .............................. B24B 49/00; B24B 51/00
(52) U.S. Cl. ................................ 451/5; 451/54; 29/603.09
(58) Field of Search ...................... 451/5, 54; 29/603.09, 29/603.19, 603.1; 360/102–105, 122

(56) References Cited

U.S. PATENT DOCUMENTS

| | | |
|---|---|---|
| 5,203,119 * | 4/1993 | Cole ............................................ 451/5 |
| 5,266,769 | 11/1993 | Deshpande et al. . |
| 5,442,850 | 8/1995 | Kerth et al. . |
| 5,687,042 | 11/1997 | Chhabra et al. . |
| 5,695,387 * | 12/1997 | Moravec et al. ........................ 451/5 |
| 5,713,123 | 2/1998 | Toyoda et al. . |
| 5,718,035 | 2/1998 | Yamanaka et al. . |
| 5,722,156 | 3/1998 | Balfrey et al. . |
| 5,739,048 | 4/1998 | Kerth et al. . |
| 5,761,790 | 7/1998 | Carr et al. . |
| 5,771,570 | 6/1998 | Chhabra et al. . |
| 5,816,890 | 10/1998 | Hao et al. . |
| 6,017,264 * | 1/2000 | Strom ..................................... 451/41 |
| 6,093,083 * | 7/2000 | Lackey .................................. 451/11 |

\* cited by examiner

*Primary Examiner*—M. Rachuba
(74) *Attorney, Agent, or Firm*—Oppenheimer Wolff & Donnelly, LLP; Larry B. Guernsey

(57) ABSTRACT

A number of transducers are produced on a substrate, the transducers positioned on the substrate in non-linear rows. The substrate is then sliced into rows. Each row is then lapped with a curved lapping plate. Finally, each row is sliced into individual sliders, each slider now having an air bearing surface with non-zero camber.

10 Claims, 6 Drawing Sheets

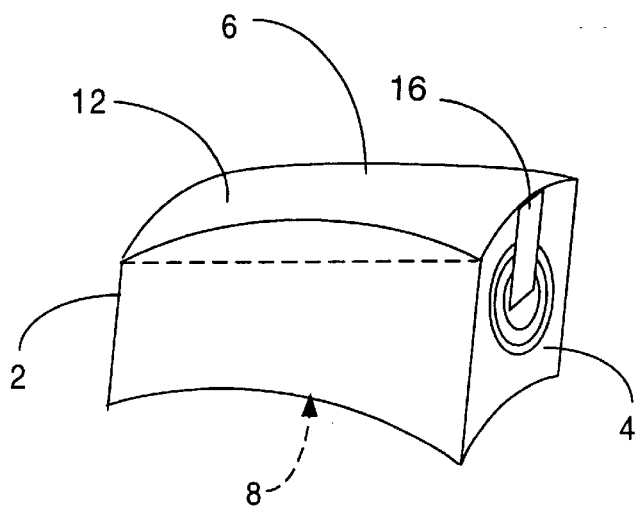
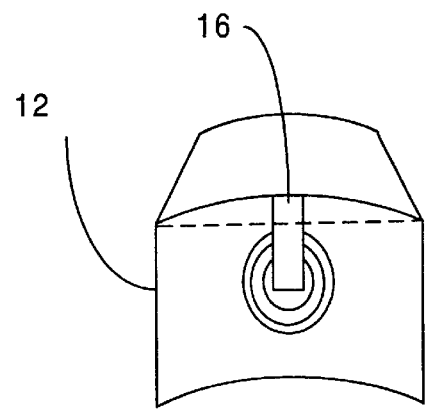
FIGURE 1
(Prior Art)
FIGURE 2
(Prior Art)
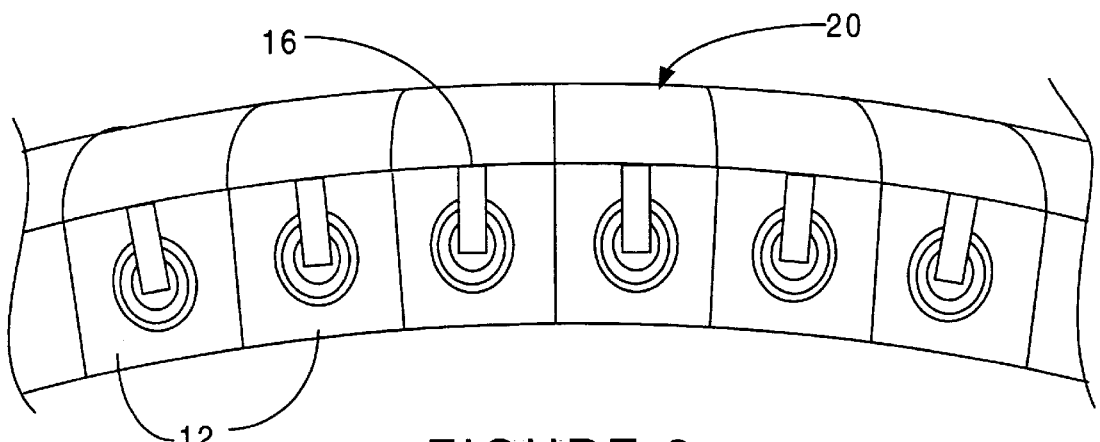
FIGURE 3
(Prior Art)

NON-LINEAR TRANSDUCER LAY-OUT OF THIN FILM HEAD WAFER FOR FABRICATION OF HIGH CAMBER AND CROWN SLIDERS

BACKGROUND OF THE INVENTION

1. Field of the Invention

The present invention relates to an improved method for the manufacture of air bearing sliders for use in a magnetic storage disk drive. More particularly, the invention relates to a method for producing a high camber and crown in air bearing sliders.

2. Description of the Background Art

Magnetic storage disk drives typically include a magnetic transducer called a "head" suspended in close proximity to the magnetic disk, which serves as the recording medium. In Winchester-type disk drives, a magnetic thin film head is embedded in a ceramic block, called a slider, which is then attached to a flexible suspension. During operation, the rotation of the magnetic disk relative to the slider provides an air flow along the surface of the slider, which causes it to lift, so that the slider is supported on a cushion of air. This surface of the slider is referred to as the Air Bearing Surface (ABS). The slider can also be thought of as having a "leading end", into which airflow enters and a "trailing end" from which it exits. The transducer head typically is positioned at the trailing end of the slider, which is generally closer to the disk surface than the leading end. The distance between the head and the disk surface is referred to as the "fly height". It is desirable for the head to fly very close to the disk surface in order to detect and read the information magnetically encoded on the disk surface. For this reason, fly height stability is of crucial importance in the disk drive operation.

The physical shape of the slider's ABS has been found to be important to the fly height. Curvature of the slider along the length from leading end to trailing end has been termed "crown" and is considered to be positive when the curvature is convex, and negative when it is concave. Everything else being equal, positive crown tends to cause the head to fly higher, relative to the disk surface, thus decreasing the head's sensitivity, while negative crown causes the head to fly lower, thus risking contact with the disk. FIG. 1 (Prior Art) illustrates a slider 12 having a leading end 2, a trailing end 4, an upper surface 6, which will be the Air Bearing Surface (ABS) and a lower or back surface 8, and including a transducer 16 in the trailing end 4. The slider 12 in FIG. 1 illustrates positive crown. A dashed horizontal line is provided as reference to demonstrate the arc of the positive crown.

Another factor to be considered in disk drive head design is take-off speed, which is defined as the velocity necessary for a slider to fly at a height above all the surface roughness of the disk. This factor too is influenced by crown of the slider.

When the slider is curved across the width of the unit, this curvature is termed "camber" and can also be positive (convex) or negative (concave). Camber has been found to influence flying and tribological considerations. FIG. 2 (Prior Art) shows a slider 12 having positive camber containing a transducer 16. Again a horizontal reference line is provided to emphasize the degree of curvature of the positive camber.

Presently, it is thought desirable to have both positive crown and positive camber in order to achieve desired fly height, fly height stability, take-off speed and certain other aerodynamic characteristics.

As shown in FIGS. 4 and 5(Prior Art), sliders 12 are typically manufactured by embedding a matrix 14 of transducer elements 16 into a wafer 18, which is then sliced into rows 20. These rows 20 are eventually sliced into individual units 22, producing the individual sliders 12. The top surface 24 of the row 20 is lapped to become the Air Bearing Surfaces (ABS) 26 of the individual slider units.

A historical manner of producing positive crown and camber was by removing small amounts of material from the ABS using a lapping plate having the desired curvature. This was done to individual sliders at the end of the slider fabrication process, and was separate from the row level lapping process in which the sensor height was defined. The processing of individual sliders is not efficient due to their small size.

In current practice, the rows are lapped to the appropriate dimensions, before they are sliced into individual units. In the fabrication process, some rows bow under stress exhibiting what is known as "row bow", (see FIG. 3 (Prior Art), which can produce an unintended result of both positive camber and crown in the sliders, once they are cut apart into individual units. However, there is usually considerable variation in rows with row bow, and it is thus not considered as a controllable method of producing camber and crown in sliders. Row bow is generally avoided in manufacturing, and several schemes have been proposed to eliminate it. Additionally, there are residual stresses left in the straight rows which are produced from bowed rows, and post-lapping stress management of some sort is often required. Efforts directed at relaxing stress can affect reliability. In processing steps which use a laser beam to remove material and straighten bowed rows, there is a risk of thermal damage to the transducers. Also, as new ABS lapping processes are developed, less surface stress is available for stress management, resulting in an upper limit to the positive crown and camber which can be achieved.

Numerous U.S. Patents have addressed the processing of sliders. U.S. Pat. No. 5,266,769 to Deshpande et al discloses producing a stress pattern on the back side of sliders to achieve desired crown and camber. U.S. Pat. No. 5,442,850 to Kerth discloses impinging a section of the slider with a stream of particles to alter the crown and camber. U.S. Pat. No. 5,713,123 to Toyoda et al teaches creating positive crown by alternately lapping the ABS and back side of the slider to cause deformation which produce crown. U.S. Pat. No. 5,771,570 to Chhabra et al discloses a method for shifting the peak point of the crown of a slider by affixing a suspension to the bonding surface of the slider, which causes a displacement force that shifts the peak.

In all of these patents, it appears that the sliders will be arranged in linear rows, and that they will be lapped with flat plates, thus encountering the problems and drawbacks discussed above.

It is, therefore, an object of the present invention to provide an improved method for the manufacture of disk drive sliders which allow the formation of high degrees of crown and camber. A further object is to provide a method which is made more efficient by acting upon entire rows containing multiple sliders, but without the inconsistencies, limitations and post-lapping stress management required by bowed row processing. Other objects and advantages will become apparent from the following disclosure.

SUMMARY OF THE INVENTION

The present invention relates to a method for producing positive crown and camber in sliders during processing of rows of sliders.

A number of transducers are produced on a wafer in non-linear curved rows. The substrate is then sliced into rows of sliders, with the air bearing surface forming the top surface of the rows. A curved lapping plate is provided having curvature inverse to the curved surface of the row. Each row of sliders is lapped with the curved lapping plate to conform the upper surface of the row of sliders to a uniform curvature. Finally, each row of sliders is sliced into individual slider units, each slider unit now having an air bearing surface with the desired curvature.

BRIEF DESCRIPTION OF THE DRAWINGS

The objects and, advantages and features of the present invention will be more clearly understood by reference to the following detailed disclosure and the accompanying drawings in which:

FIG. 1(Prior Art) is a side perspective view of a slider showing positive crown;

FIG. 2(Prior Art) is a front perspective view of a slider illustrating positive camber;

FIG. 3(Prior Art) is a front perspective view of a row of sliders showing row bow;

DETAILED DESCRIPTION OF THE INVENTION

Figures 4, 5:
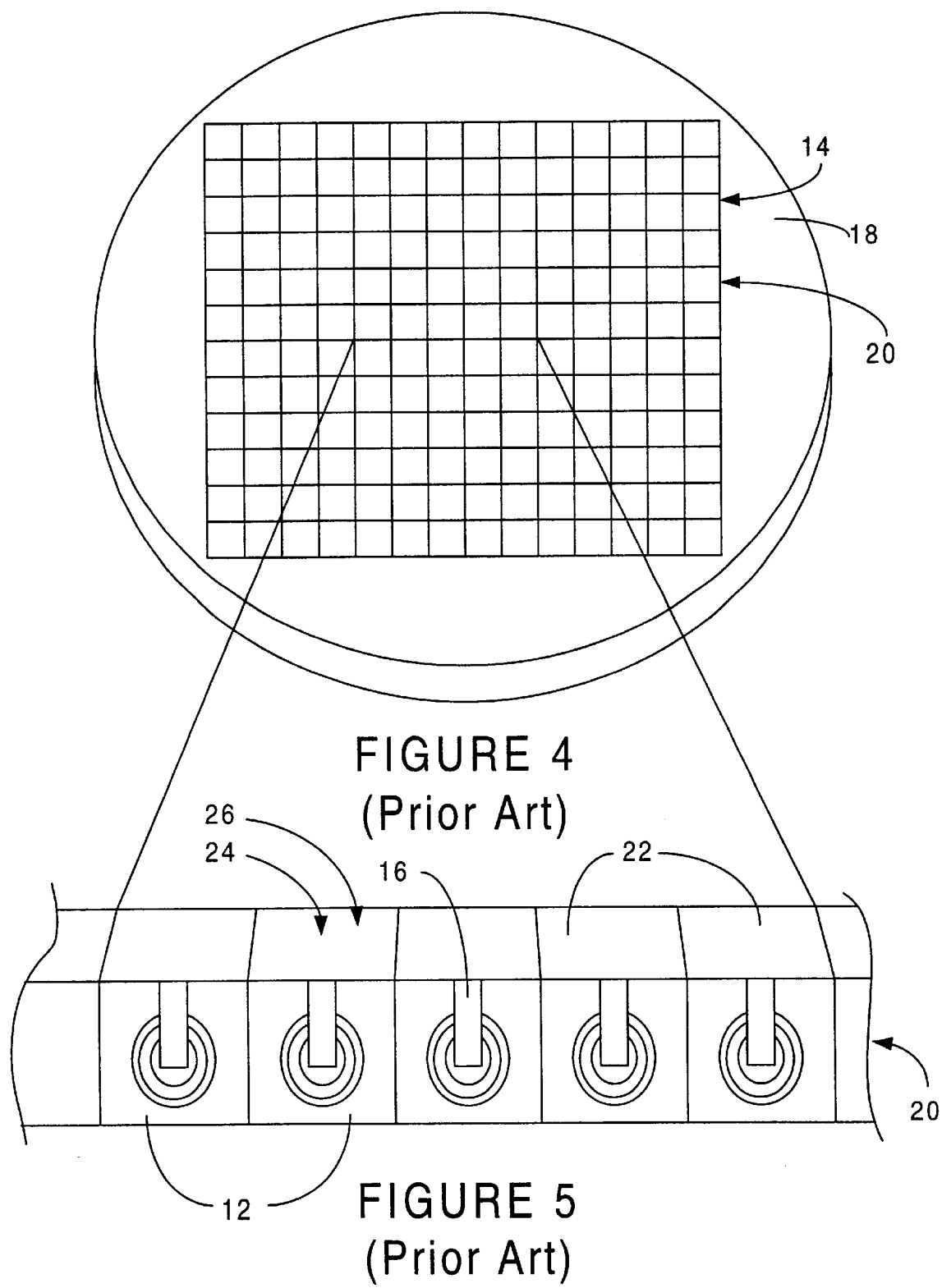
FIG. 4(Prior Art) is a front perspective view of a wafer showing a matrix containing multiple rows of sliders.
FIG. 5(Prior Art) is a front detail perspective view of a row of sliders which has been extracted from the matrix of FIG. 4.

The present invention relates to a method and apparatus for producing positive crown and camber in sliders during processing of rows. As illustrated in the various drawings herein, and particularly in the view of FIG. 10, a preferred embodiment of a slider produced by the method of the present invention is depicted by the general reference character 10.

Figure 6:
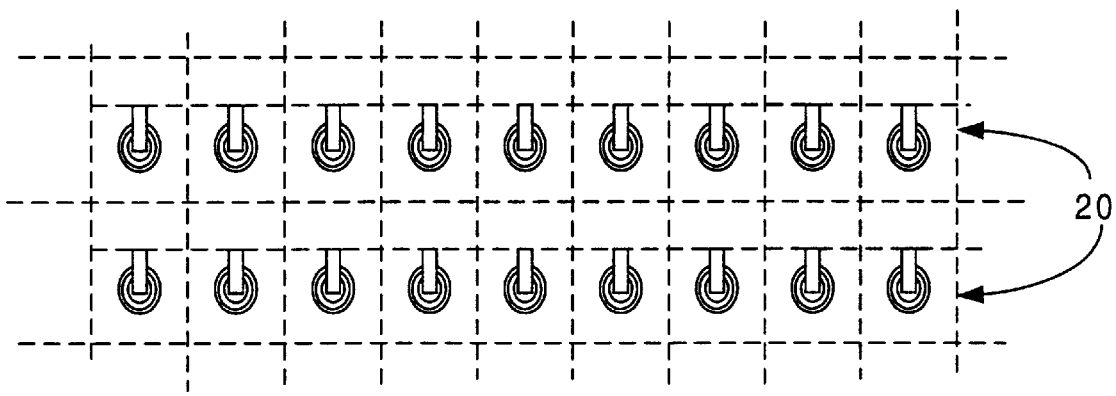
FIG. 6(Prior Art) is a front plan view of two rows of sliders aligned in linear order.

As illustrated in FIG. 4 (Prior Art), a matrix of transducers 14 is deposited on a wafer of substrate 18, according to known methods. This matrix 14 is composed of multiple rows 20 which are arranged in a linear, checkerboard pattern as shown in FIG. 6 (Prior Art).

Figure 7:
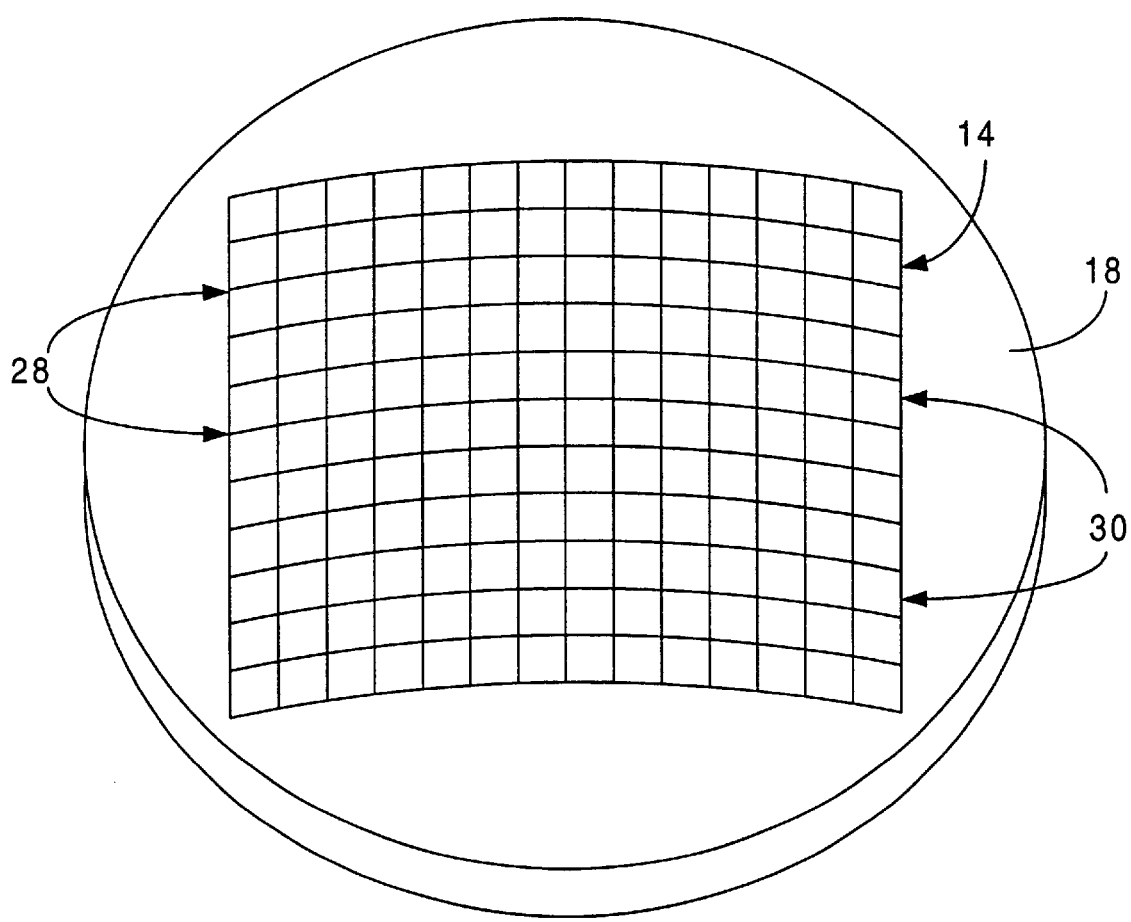
FIG. 7 is a front perspective view of a substrate having a matrix of curved layout lines, of the present invention.
Figure 8:
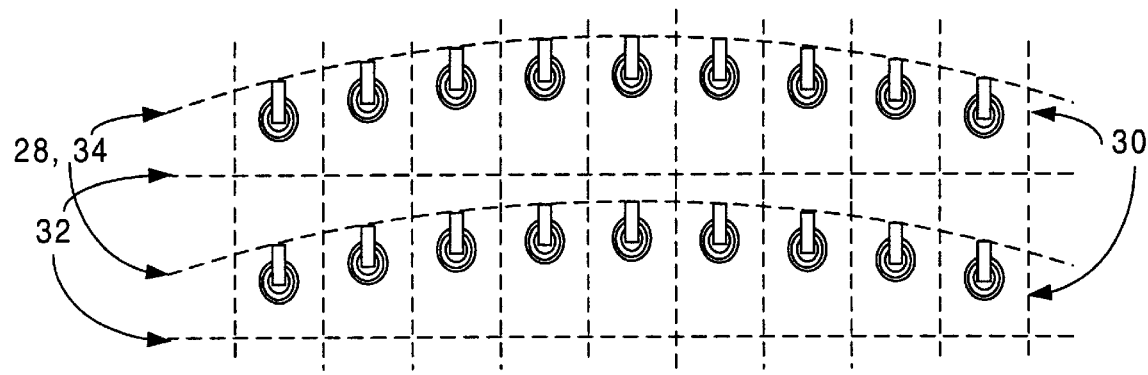
FIG. 8 is a front plan view of two rows of sliders arranged in a non-linear lay-out as in the present invention.

In contrast, FIGS. 7 and 8 show the non-linear rows of transducers 30 of the present invention formed in the wafer. The degree of curvature is much exaggerated. The transducers are deposited onto the wafer substrate 18 by use of masks (see FIG. 11). In the present invention, the transducers are arranged in non-linear rows, following curved layout lines 28 in the mask. In the case illustrated, the non-linear rows are convex arcs, which will result in an eventual positive camber in the individual sliders. It is of course equally possible to produce negative camber by using concave arcs.

FIG. 8 illustrates the final lapping arcs 34 of the rows 30. Also shown are slicing lines 32 where the rows 30 will be separated from each other. The final lapping arcs 34 show the curve of the row 30 after the lapping operation is completed.

Figure 9:
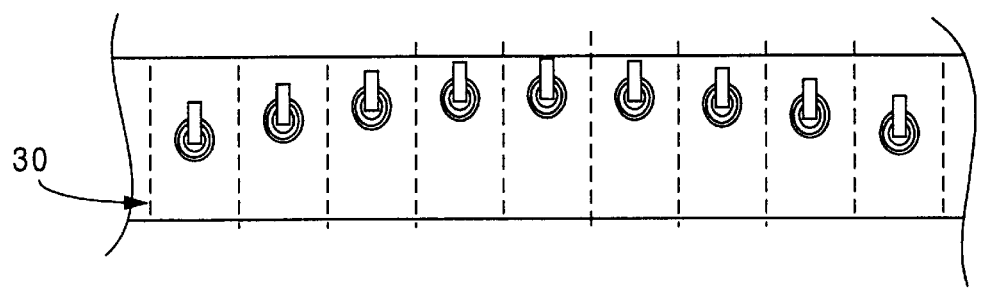
FIG. 9 is a front plan view of a single row of sliders arranged in a non-linear lay-out as in the present invention before lapping, of the present invention.

FIG. 9 shows a row after the next optional step in the process, in which coarse lapping is performed on a flat lapping plate.

Figure 10:
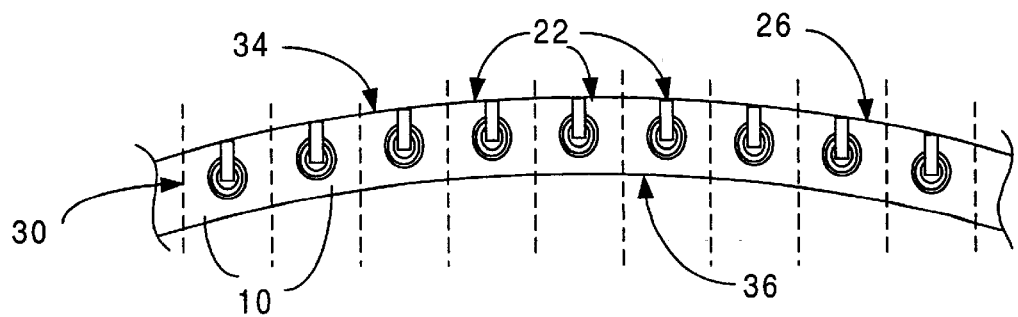
FIG. 10 is a front plan view of a single row of sliders arranged in a non-linear lay-out as in the present invention after lapping, but before cutting into individual units, as in the present invention.

As seen in FIG. 10, the row 30 is then lapped to the final lapping arc 34 on a curved lapping plate, having a curvature which is the inverse of the curvature desired in the final ABS surface 26. The back surface 36 of the row 30 is also preferably lapped so that the appropriate overall height dimension is achieved. The individual sliders 10 are then sliced apart along the dashed lines, and the process is complete.

Figure 11:
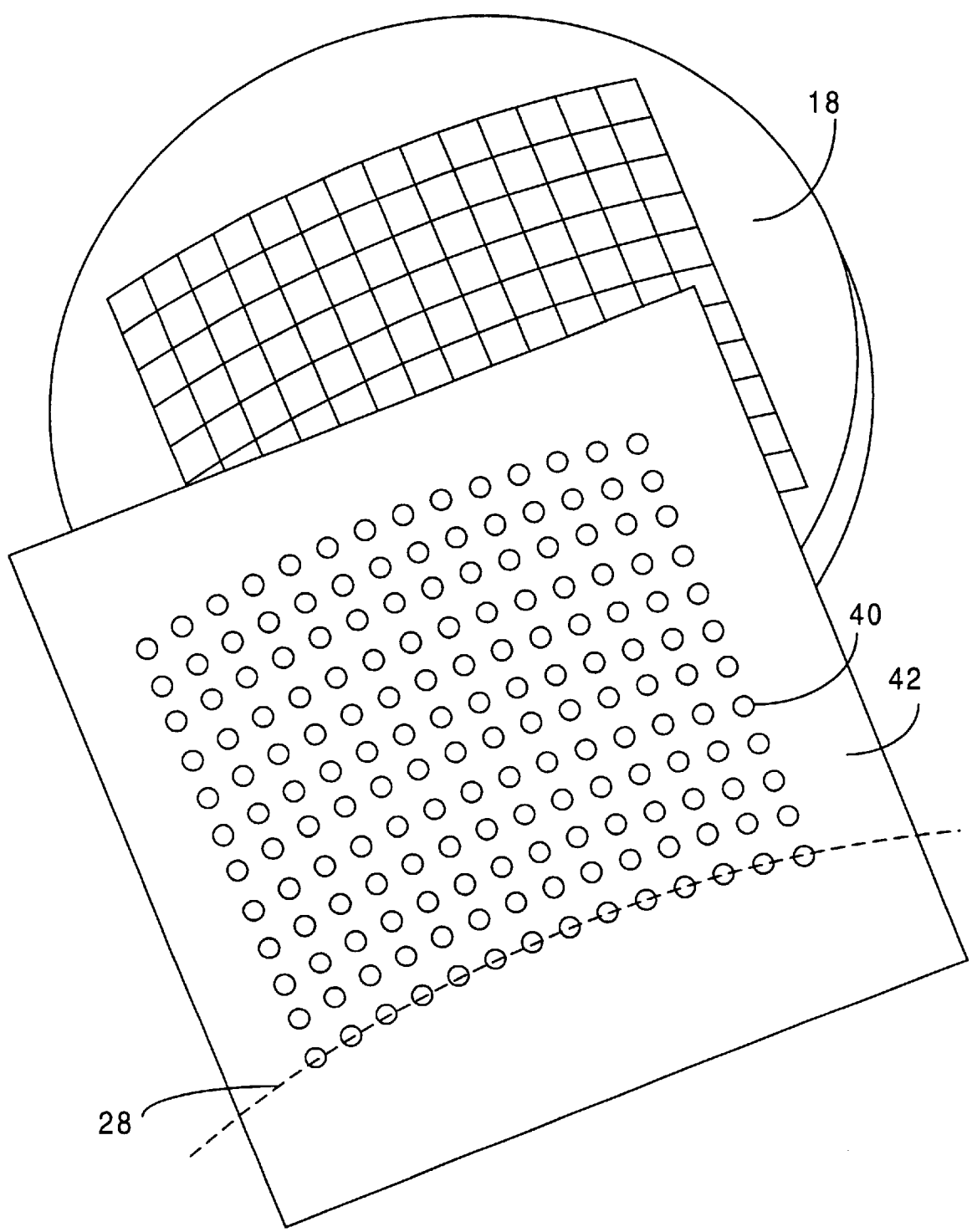
FIG. 11 is a front perspective view of a substrate with a mask, as in the present invention.

The transducers are typically formed by deposition onto the substrate wafer by known art techniques. A mask is generally positioned between the wafer and the deposition tool to locate the transducers on the wafer. As seen in FIG. 11, the placement of apertures 40 in the mask 42 locates the position of the transducers 16 on the wafer 18. Apertures 40 in the mask 42 are aligned to a curved layout line 28 that determines the placement of the transducers in a non-linear row.

It is to be understood that the mask is shown in the figure as a unitary sheet with holes in it for illustration purposes only. In practice, masks may be made by any known method such as photo-resist, etc., and may involve multiple processing steps.

As referred to above, in order to produce the appropriate crown and camber in the sliders, the lapping plate must have a curvature which is the inverse of the curvature to be produced in the sliders. This curved lapping plate can be a cylindrical section, with curvature inversely matching the arc of the slider row from side to side, but with no curvature in the direction of the slider leading end to slider trailing end. The movement of the plate relative to the row will then cause camber to be produced in the row and in each of the individual slider units in that row, but there will be no curvature in the direction of leading end to trailing end.

Alternatively, if the lapping plate is made as a spherical shape, there will be curvature in both the side to side arc of the row, and also the leading end to trailing end direction of the slider row. Lapping on such a spherical plate will produce both crown and camber in the sliders. It will be understood that other configurations of curvature for lapping plates besides cylinders and spheres are contemplated by the present invention.

Figures 12, 13:
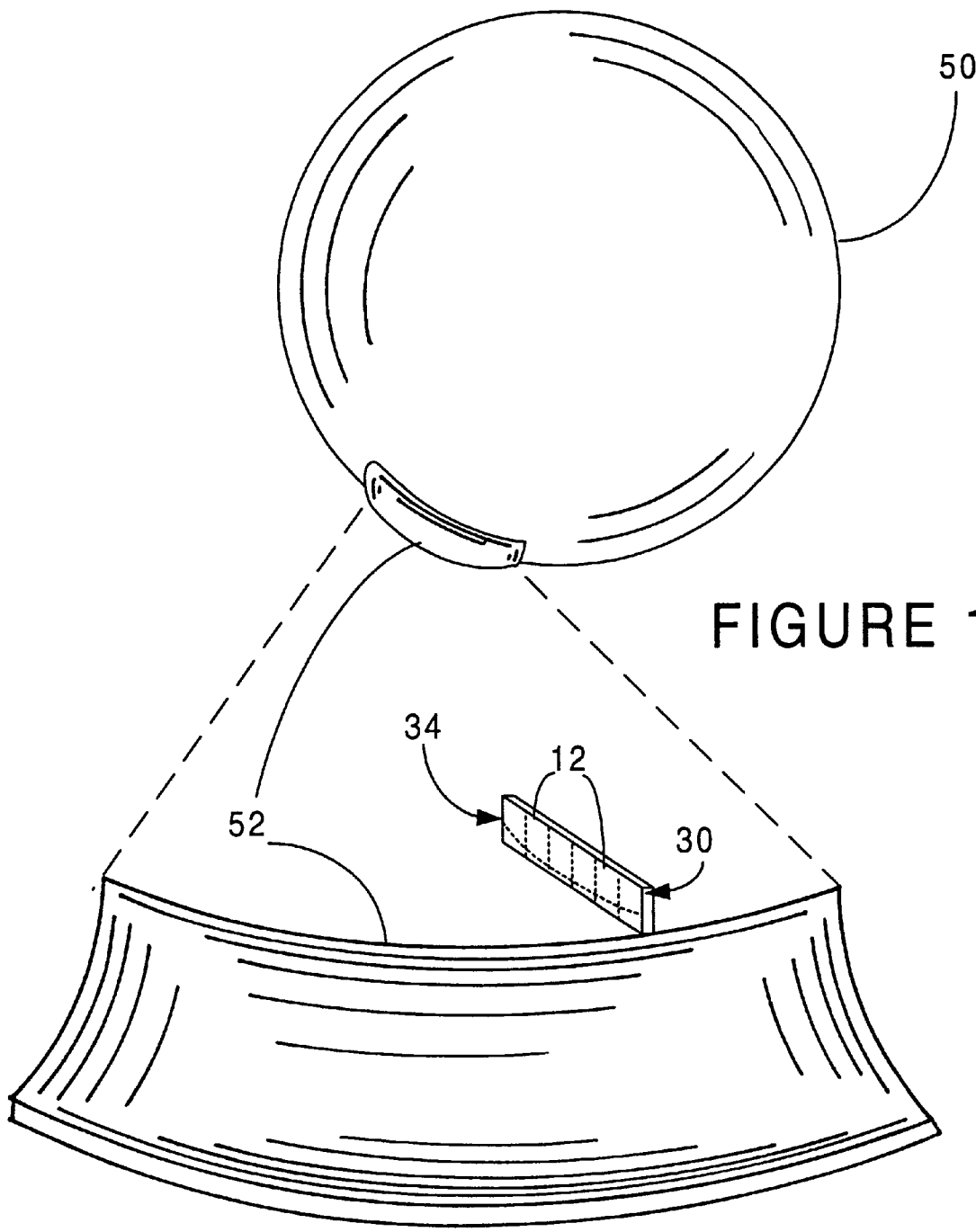
FIG. 12 is a front perspective view of a spherical master shape, and a curved lapping plate which is formed from a section of this spherical master shape, as in the present invention.
FIG. 13 is a front perspective view of a curved lapping plate having a concave spherical shape, as in the present invention.

As shown in FIGS. 12 and 13, the production of a curved lapping plate is done by first producing a master shape 50 which will define the eventual curvature of the sliders 12. If both camber and crown are desired to be positive, as will be assumed in this illustration, the ABS of the sliders will be a convex spherical section, as will the master shape 50. The lapping plate 52 will then be formed as an inverse of this master shape 50, thus being a concave spherical section. The slider rows 30 when lapped will then obtain the convex spherical section shape of the master 50.

The above method using a curved lapping plate to produce curvature in a row of sliders can also be used in conjunction with conventional stress management techniques in order to produce very high camber not achievable by conventional methods alone. For example, "row bow" can be induced in a non-linear slider row which is then lapped on a curved lapping plate. When the stress of the slider row is released, and the row sliced into individual sliders, each slider will exhibit a higher degree of camber than produced by non-linear slider rows without row bow.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

What is claimed is:

1. A method of producing non-zero camber on a slider, the slider having a leading end and a trailing end, an air bearing surface, and a back surface, comprising:
    A) producing a plurality of transducers on a substrate, the transducers positioned on the substrate in non-linear rows;
    B) slicing the substrate into rows;
    C) lapping a row with a curved lapping plate; and
    D) slicing the row into individual sliders, each slider having an air bearing surface with non-zero camber.

2. The method of claim 1, wherein the rows are arcuate.

3. The method of claim 1, wherein the lapping plate in step C is a cylindrical section.

4. The method of claim 1, wherein the lapping plate in step C is a spherical section, to produce non-zero crown in the air bearing surface of each of the sliders.

5. The method of claim 3, wherein said lapping plate in step C is concave, to produce positive camber in the air bearing surface of each of the sliders.

6. The method of claim 3, wherein said lapping plate in step C is convex, to produce negative camber in the air bearing surface of each of the sliders.

7. The method of claim 4, wherein said lapping plate in step C is concave, to produce positive camber and positive crown in the air bearing surface of each of the sliders.

8. The method of claim 4, wherein said lapping plate in step C is convex, to produce negative camber and negative crown in the air bearing surface of each of the sliders.

9. The method of claim 1, wherein step C further comprises:
    1) inducing stress in the slider row; and
    2) lapping with the curved lapping plate while maintaining stress in the slider row.

10. The method of claim 9, wherein the stress induced is compressive stress.

* * * * *